US012296536B1

(12) United States Patent
Vatani et al.

(10) Patent No.: US 12,296,536 B1
(45) Date of Patent: May 13, 2025

(54) METHOD AND APPARATUS FOR POWDER REMOVAL IN AN ADDITIVE MANUFACTURING SYSTEM

(71) Applicant: Sakuu Corporation, San Jose, CA (US)

(72) Inventors: Morteza Vatani, Los Gatos, CA (US); Karl Littau, Los Altos Hills, CA (US); Seyed Mohammad Sajadi, Sunnyvale, CA (US)

(73) Assignee: Sakuu Corporation, San Jose, CA (US)

( * ) Notice: Subject to any disclaimer, the term of this patent is extended or adjusted under 35 U.S.C. 154(b) by 0 days.

(21) Appl. No.: 18/152,854

(22) Filed: Jan. 11, 2023

Related U.S. Application Data

(60) Provisional application No. 63/299,776, filed on Jan. 14, 2022.

(51) Int. Cl.
*B29C 64/35* (2017.01)
*B33Y 40/20* (2020.01)

(52) U.S. Cl.
CPC .............. *B29C 64/35* (2017.08); *B33Y 40/20* (2020.01)

(58) Field of Classification Search
CPC .... B23K 26/361; B23K 26/362; B23K 26/38; B29C 64/35; B29C 64/188; B29C 64/194; B29C 64/357; B22F 10/68; B22F 10/50; B22F 10/73
See application file for complete search history.

(56) References Cited

U.S. PATENT DOCUMENTS

| | | | |
|---|---|---|---|
| 10,543,530 B2 | 1/2020 | Hermann et al. | |
| 11,097,484 B1* | 8/2021 | Snyder | B29C 64/379 |
| 11,185,396 B2 | 11/2021 | Zenou et al. | |
| 2003/0178395 A1* | 9/2003 | Duignan | C23C 14/048 |
| | | | 219/121.61 |
| 2004/0094728 A1* | 5/2004 | Herzog | B22F 10/364 |
| | | | 250/559.22 |
| 2011/0190904 A1 | 8/2011 | Lechmann et al. | |
| 2015/0108695 A1* | 4/2015 | Okada | B29C 64/393 |
| | | | 264/497 |
| 2016/0101470 A1 | 4/2016 | Kamakura | |

(Continued)

FOREIGN PATENT DOCUMENTS

CN 111151744 A * 5/2020
DE 112014004777 T5 6/2016

(Continued)

OTHER PUBLICATIONS

International Search Report and Written Opinion issued Apr. 17, 2023 in corresponding PCT/US2023/060752, 13 pages.

(Continued)

*Primary Examiner* — Seyed Masoud Malekzadeh
*Assistant Examiner* — Vipul Malik
(74) *Attorney, Agent, or Firm* — Arman Khosraviani

(57) ABSTRACT

An improved method and apparatus are provided for removing powder in an additive manufacturing system. In one implementation for removing non-patterned powder from a substrate having a patterned powder portion, and a non-patterned powder, at least one laser having beam parameters is applied to the non-patterned powder for a period of time sufficient to remove the non-patterned powder from the substrate.

23 Claims, 8 Drawing Sheets

(56) References Cited

U.S. PATENT DOCUMENTS

| | | | |
|---|---|---|---|
| 2017/0246683 A1* | 8/2017 | Jones | B22F 10/38 |
| 2019/0022942 A1* | 1/2019 | Fulop | B29C 64/357 |
| 2020/0298477 A1* | 9/2020 | Rogren | B29C 64/223 |
| 2021/0291445 A1 | 9/2021 | Coward | |
| 2022/0168958 A1 | 6/2022 | Lawther et al. | |

FOREIGN PATENT DOCUMENTS

| | | | | |
|---|---|---|---|---|
| DE | 102020106822 A1 * | 9/2021 | | B22F 10/25 |
| EP | 3919260 A1 | 12/2021 | | |
| WO | WO-2019094276 A1 * | 5/2019 | | B22F 10/20 |
| WO | WO-2019162654 A1 * | 8/2019 | | B23K 26/342 |

OTHER PUBLICATIONS

Frank et al., "Infrared steam laser cleaning," First publ. in: Applied Physics / A, Materials Science and Processing, 93 (2008), 1, pp. 1-4.

\* cited by examiner

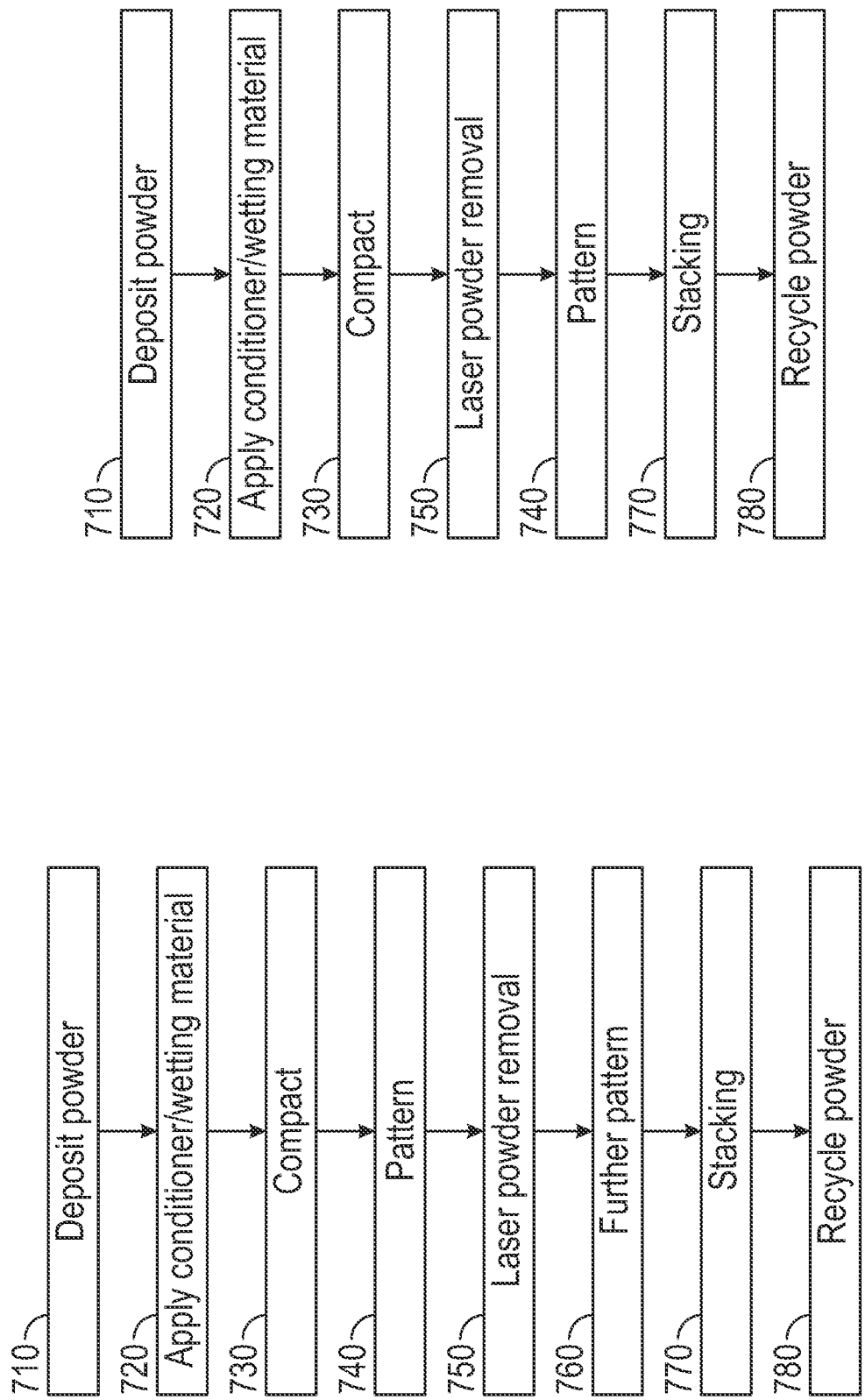

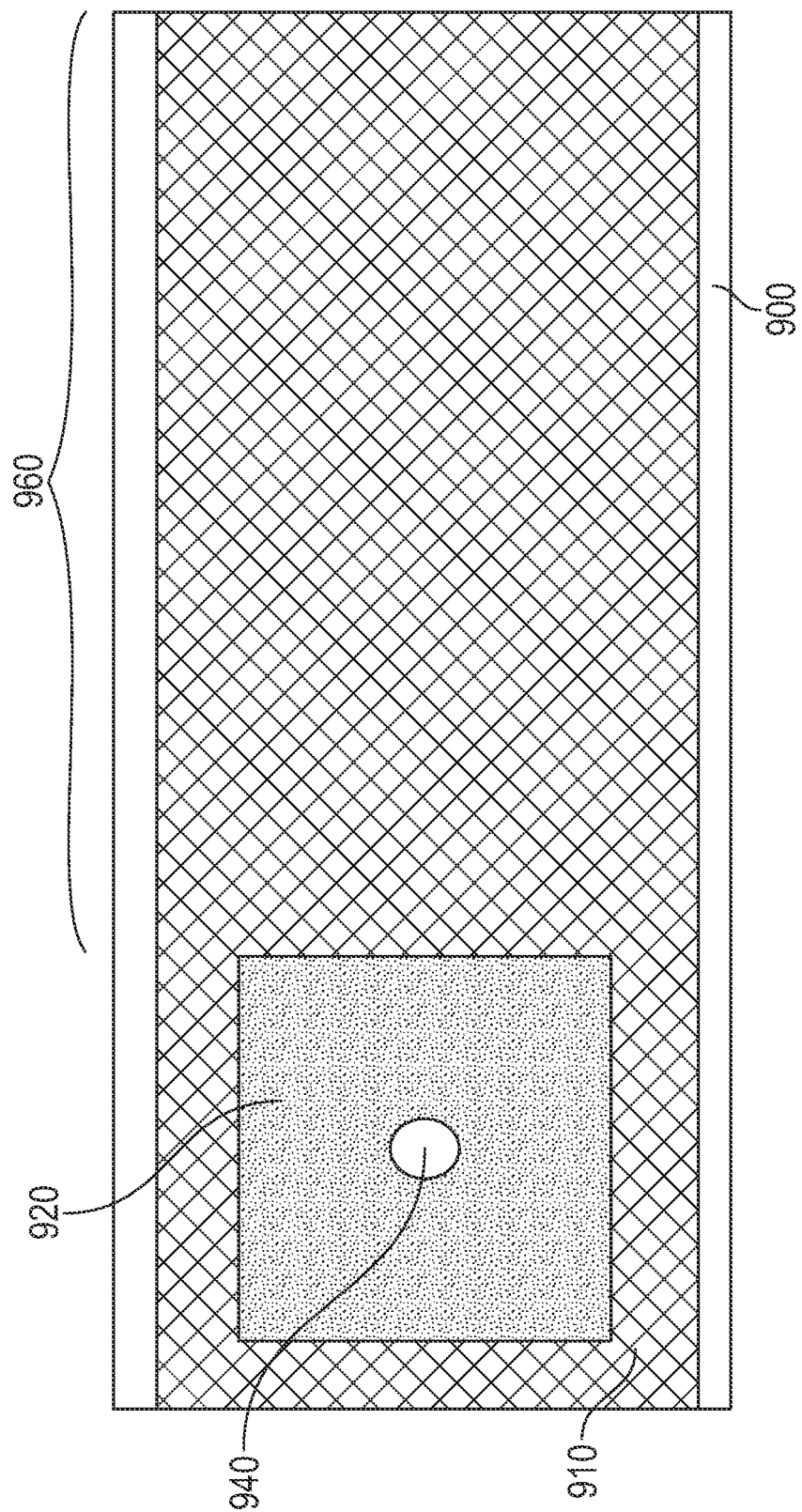

METHOD AND APPARATUS FOR POWDER REMOVAL IN AN ADDITIVE MANUFACTURING SYSTEM

TECHNICAL FIELD AND BACKGROUND

The present disclosure pertains to an improved method and apparatus for removing powder in an additive manufacturing system.

In conventional AM systems, such as 3D printing systems, manual devices such as brushes and end mills have been used to remove loose powder or loosen compacted powder from 3D printed parts. Any residual power can be further dislocated by an air knife, and vacuum ports can be used to aid in the extraction of any dislodged powder. Air can be used to remove portions of the material that have not been exposed to the binding material and cured. These techniques, combined with rotating, tilting, and/or vibrating of the substrate, can optimize the powder removal process. Vibration without air can also be used, with physical shaking of the part being an option. However, these physical removal methods are time-consuming, and fixed portions of the material are prone to damage (whether solidly fixed of partially fixed), in particular, the edges or surfaces which may be manually disturbed and break away. Depending upon the manual device used, it is also possible that the device is not able to reach all the corners or crevices in which loose or uncured material may reside. Furthermore, there is a limitation on the physical size of the brushes or end mills that can be incorporated into 3D printing systems.

In some instances, liquid immersion has been used to remove non-solidified portions of material, typically using fluid flow to clean portions of the material that were not exposed to the binding material and cured. The portions of the material that were not exposed to the binding material and cured may be dissolved in a solution, being washed away. Alternatively, the part can be immersed in a fluid bath and a transducer used to create ultrasound waves which ultimately remove debris from the part. One disadvantage of this process is that the part has be immersed in a liquid. Another disadvantage is that the removed powder is now useless, and unable to be reused without significant processing.

With all the powder removal methods mentioned above, it can be seen that improvement is needed in the removal of material that has not been exposed to the binding material and cured.

SUMMARY OF THE INVENTION

A method for removing non-patterned powder from a substrate having a patterned powder portion, and a non-patterned powder, deposited thereon, including applying at least one laser beam having beam parameters to the non-patterned powder for a period of time sufficient to remove the non-patterned powder from the substrate so that an upper surface of the substrate where the non-patterned powder had been located is free of the non-patterned powder, while leaving the patterned powder portion on the substrate.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 7 shows a flow chart of an overall printing process using powder deposited on a substrate, including laser powder removal using the laser station shown in FIG. 6, in accordance with aspects of the present disclosure.

FIG. 8 shows an alternative flow chart of an overall printing process using powder deposited on a substrate, including laser powder removal using the laser station shown in FIG. 6, in accordance with aspects of the present disclosure.

FIG. 9 shows a view of a substrate, in accordance with a yet further implementation, having patterned and non-patterned powder deposited thereon, subjected to a laser powder removal process and another powder removal technique in accordance with aspects of the present disclosure.

DETAILED DESCRIPTION

Figure 1A:
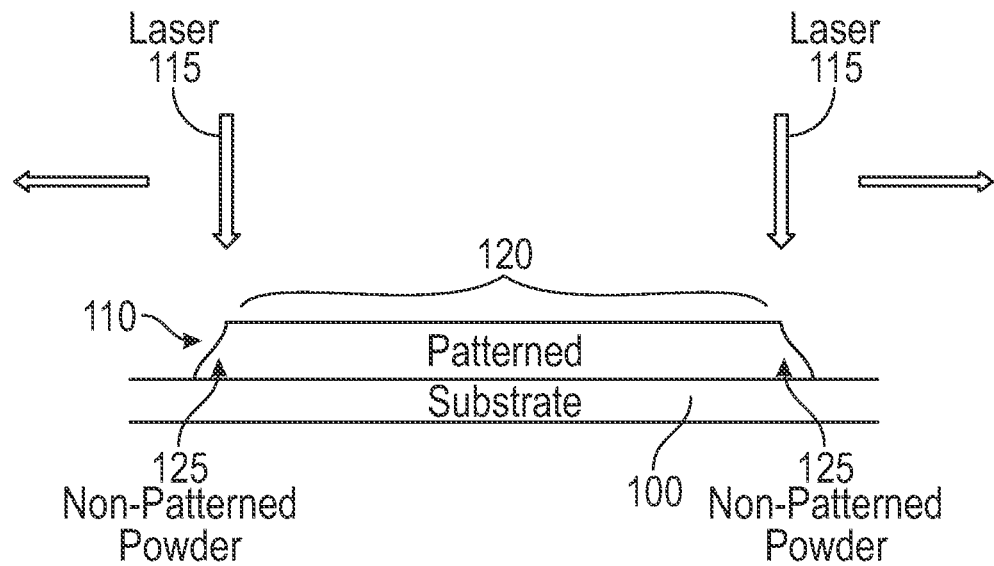
FIG. 1a shows a view of a substrate, having patterned and non-patterned powder deposited thereon, subjected to laser powder removal processing in accordance with aspects of the present disclosure.

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

In conventional additive manufacturing (AM), the layers are built on top of each other, or they are built on a conveyor belt, and at the last stage, they are stacked on each other. However, as described in related provisional application No. 63/299,867 by the Applicant, entitled "Printing Method and Apparatus for Additive Manufacturing, Including In-situ Powder Regeneration," filed on Jan. 14, 2022, and which is hereby incorporated by reference, a platform, for AM manufacturing has been developed which is a modular base machine that builds each layer separately. Each individual layer passes several stations, and each station has a unique function. Handling the layers between stations in this new platform requires carrier plates for carrying the individual layers of the multilayer product being manufactured. Thus, carrier plates are disclosed herein which are particularly adapted to the new platform described in the above-noted related application, which is hereby incorporated by reference. In particular, the present disclosure pertains to the use of these carrier plates for supporting individual layers in a 3D printing system, and subjecting these individual layers to a laser powder removal step in a laser station. Additional features of carrier plates regarding the present application are described in related application Ser. No. 18/074,298 by the Applicant, entitled "Carrier Plate and Method of Use Thereof," filed on Dec. 2, 2022, and which is hereby incorporated by reference.

In the above-noted related application, an improved method and system for additive manufacturing is also described including an in-situ powder regeneration system. An exemplary method described in the related application includes applying powder to a substrate at a powder applying station, removing a first portion of the powder and collecting the removed first portion of the powder in a clean powder collection container, moving the powder remaining on the substrate to a wetting station and wetting the powder with a wetting agent at the wetting station, removing a second portion of the powder, after wetting, and collecting the removed second portion of the powder in a wet powder contaminated collection container, moving the powder, after wetting and removal of the second portion, to a binder applying station and applying a binder to the powder at the binder applying station; and removing a third portion of the powder, after applying the binder, and collecting the removed third portion of the powder in a binder contaminated powder collection container.

The above-noted related application also describes a system and a method for applying powder to a substrate at a powder applying station, removing first portions of the powder to create clean portions of the substrate between portions of deposited powder, moving the portions of deposited powder remaining on the substrate to a wetting station and wetting the powder with a wetting agent at the wetting station, passing the wetted portions of deposited powder through calendering rollers to compact the powder, cutting the substrate at the clean portions to create substrate segments each respectively including one of the portions of the deposited powder, moving the substrate segments having the portions of deposited powder, to a binder applying station and applying a binder to the powder at the binder applying station to harden the deposited powder into layers, transferring the substrate segments having the layers mounted thereon to respective carrier plates, and moving the carrier plates, with the substrate segments having the layers mounted thereon, to a stacking station, and inverting each of the carrier plates in order to separate the layers from the substrate segments and to stack the layers individually on one another to form a multilayer product. The present disclosure can be incorporated into the system described in the above-noted related application as part of the overall removal of excess non-patterned powder in the overall 3D printing operation. It is noted that, although a certain order of steps is discussed above, the order of the steps could be changed, if desired, without departing from the scope of this disclosure.

The present disclosure pertains to an improved method and apparatus for removing powder in an additive manufacturing system. In particular, this disclosure provides a method and system by which powder, or material that has not been exposed to a binding material and has not been cured (materials that are not fixed in place, fused or melted), can be removed. The method and system can also be implemented to remove one portion of powder that has binder while not removing another portion of powder that also has binder. For example, in one implementation, the powder or material removed may have not been exposed to same binding material as other powder which is fixed in place, fused or melted. In other implementations, one or more additives may be included to inhibit the powder removal in the patterned area and to facilitate/enhance powder removal in the non-patterned area by the laser removal process. The additive may be added to either the powder or the substrate. The differentiation between the materials can enable one material to be removed while the other material(s) remains in place. In other implementations, the differentiation between the materials enables one material to be removed while the other remains in place until a later time, at which time it may be removed under different powder removal conditions, e.g., different laser powers or frequencies. The removal in accordance with the techniques described herein is less time-consuming than existing convention powder removal methods and does not require the inclusion of physical devices which may disturb or damage the bound product (e.g., the powder which has been subjected to binding material, and is cured and hardened to form a patterned powder layer).

Figure 1B:
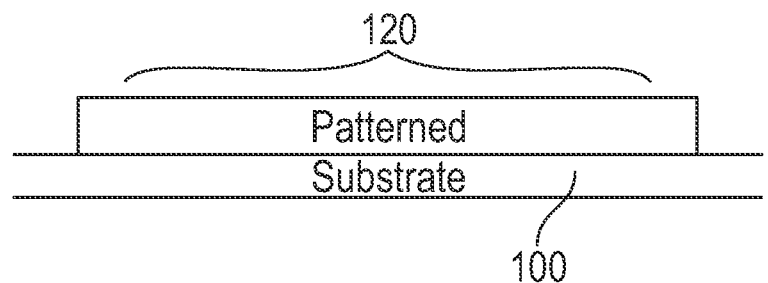
FIG. 1b shows a view of the substrate of FIG. 1a after the laser powder removal processing of FIG. 1a, in accordance with aspects of the present disclosure.

In one implementation shown, for example, in FIGS. 1*a* and 1*b*, after a binding step of a 3D printing operation has been performed on powder 110 deposited on a substrate 100 to provide a patterned portion 120 of the powder 110, a laser beam 115 is directed towards adjacent non-patterned loose powder areas 125, that is areas in which the powder 110 has not be exposed to binding material and has not been cured. It is noted that, although only one laser beam 115 is shown, a plurality of laser beams generated from a plurality of lasers could be used to remove powder simultaneously from different areas. Also, different powder removal devices, such as air knifes, vacuum devices, etc., could be used in conjunction with the one or more lasers to remove powder simultaneously from different areas. The non-patterned material 125 is essentially loose powder, or at least not fixed. Selection of the beam parameters (profile, beam size, beam diameter, divergence, wavelength, power/energy, operational time, pulse duration, repetition rate, area of application, depth of absorption, etc.) of the laser 115 and the various materials are such that the energy is absorbed by the non-patterned material 125 (e.g., loose powder), but not by the substrate 100 on which it sits. The energy provided by the laser 115 is absorbed by the loose/not fixed powder 125, which experiences an increase in temperature. As a result of the absorption of energy, the loose/not fixed powder 125 dissipates, separating further from the cured material portions 120 of the powder (e.g., patterned powder) that it is adjacent to. The laser parameters can be adjusted such that the power is delivered at a point just outside a layer of the patterned powder material 120, for a sufficient time and in a specified amount for the unbound (non-patterned) powder 125 to reach the required temperature to remove the unbound powder 125 from the substrate 100. FIG. 1b shows the results after the laser processing shown in FIG. 1a has been completed, in which only the bound, patterned powder 120 remains.

The mechanism for this absorption of the laser energy by the loose powder 125 is due to a phase explosion of possible liquid around the particles, i.e., a thin liquid water layer condensed on top of the particles and substrate 100 which is rapidly heated. The pressure generated during the subsequent phase explosion generates a cleaning force which exceeds the adhesion of the particles. The pulse energy from the laser 115 also moves the particles. This phenomenon is explained in an article entitled "Infrared steam laser cleaning", First publ. in: Applied Physics/A, Materials Science and Processing. 93 (2008), 1, pp. 1-4, P. Frank•F. Lang•M. Mosbacher•J. Boneberg•P. Leiderer, which is hereby incorporated by reference. In other words, the liquid water layer can be viewed as effectively being a conditioning agent, which would enable control of the process.

Figure 2A:
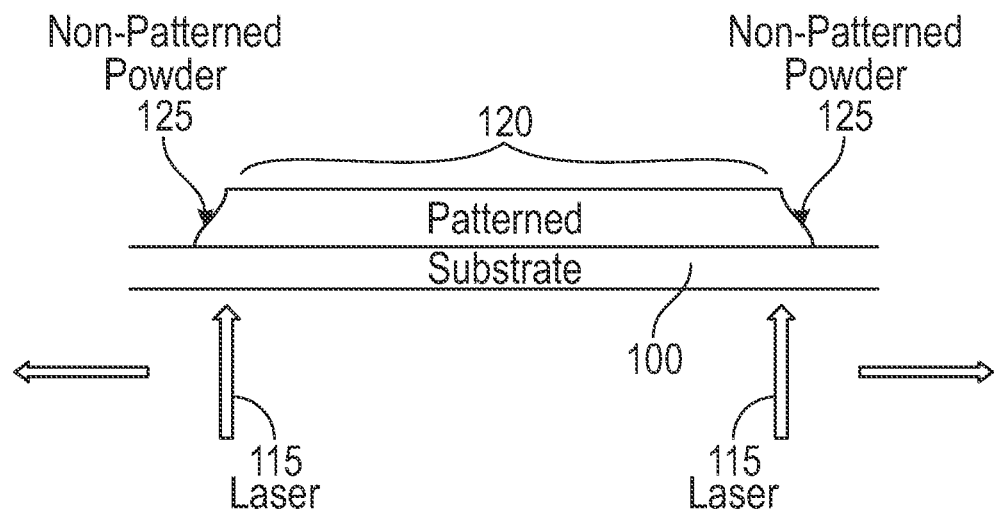
FIG. 2a shows a view of a substrate, in accordance with an alternative implementation, having patterned and non-patterned powder deposited thereon, subjected to laser powder removal processing in accordance with aspects of the present disclosure.
Figure 2B:
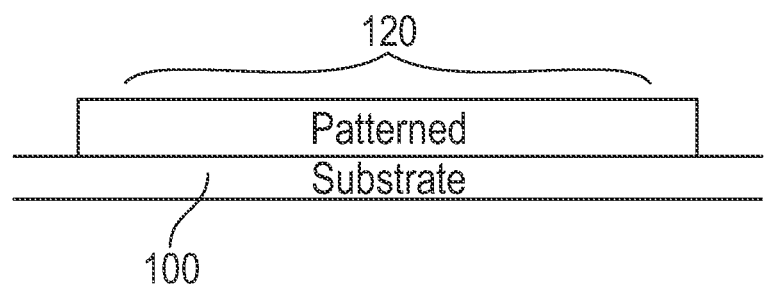
FIG. 2b shows a view of the substrate of FIG. 2a after the laser powder removal processing of FIG. 2a, in accordance with aspects of the present disclosure.
Figure 4A:
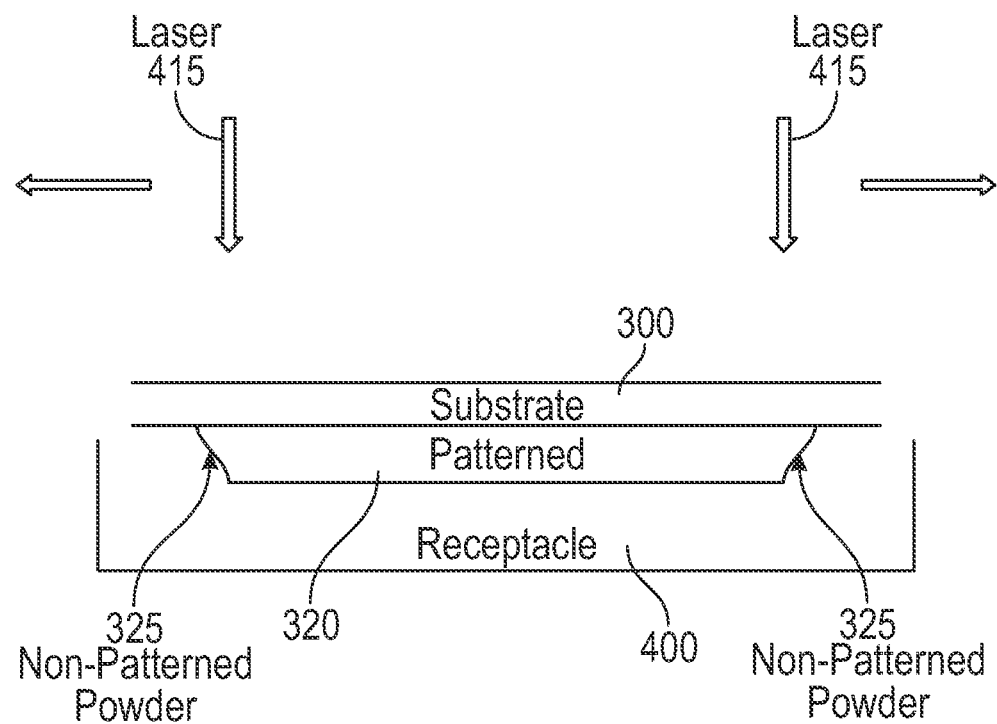
FIG. 4a shows a view of a substrate, in accordance with another alternative implementation, having patterned and non-patterned powder deposited thereon, subjected to laser powder removal processing in accordance with aspects of the present disclosure.

As shown in FIG. 1a, the laser(s) 115 can be moved to be directed along a contour of the patterned powder 120, in corners, or in a direction away from the patterned powder 120 to remove additional unbound powder 125. The laser removal step can be performed at the end of creation of each layer, rather than at the end of an entire 3D-printed object as with conventional powder bed systems. In some implementations, the laser(s) 115 can be moved over the entire layer, over not only the non-patterned powder 125, but the patterned powder areas 120 also. In this manner, all unbound or non-patterned powder 125 within the entire layer may be removed. Each patterned powder layer 120 or object may subsequently be separated from the substrate 100 and stacked individually on one another to form a multilayer part. Regarding the characteristics of the laser 115 to perform the powder removal, reference is again made to "Infrared steam laser cleaning" article mentioned above for further details regarding a laser cleaning process, using an agent to control the laser penetration depth, aspects of which can be modified. As shown in FIGS. 1a, 2a and 4a, a plurality of lasers 115 can be used, if desired, for simultaneous operation to increase the speed the powder removal process by performing powder removal in multiple locations where non-patterned powder exists.

In some implementations, an air stream (see air knife 1080 in FIG. 10) can optionally be applied to the area at which the laser 115 is currently being directed, or at which the laser was previously directed and has now been stopped. Also, a camera system can be integrated (with a corresponding control system such as control system 650 in FIG. 6) to monitor the volume of non-patterned powder 125 remaining around the patterned powder 120, and the laser 115 can be directed accordingly, in terms of intensity, direction, time of exposure, etc. For example, by superimposing the coordinates from the jetted binder onto an image of the patterned powder 120, the volume of non-patterned powder 125 can be determined from the image, and a laser 115 directed towards those areas of larger volume around the patterned powder 120, taking into consideration the distance the laser 120 has to move, of course, so that it is not "jumping" around.

In accordance with aspects of the present disclosure, the laser 115 is operated below a first threshold at which the combination of binder material and powder would be caused to connect/bond/fuse/melt and taking into consideration a second threshold at which it has no effect on the substrate 110. As there is no physical contact made in order to facilitate powder removal, damage to the patterned part is minimized, and time saved.

In the implementation shown in FIG. 1a, the laser beam(s) 115 is applied from above the substrate 100 and the powder 110. In accordance with an alternative implementation, however, the laser beam(s) 115 is applied from below the substrate 100 (e.g., see FIG. 2a), such that the laser beam 115 passes through the substrate 100 to be absorbed by the non-patterned powder 125. As mentioned above, the parameters of the laser beam 115 and the materials used for the powder 110 and the substrate 100 are chosen so that the laser light 115 is absorbed by the non-patterned powder 125, not by the substrate 100. This flexibility in terms of placement of the laser 115 above or below the substrate 100 enables this laser powder removal system to be integrated into various 3D printing systems of varying designs.

Figure 3:
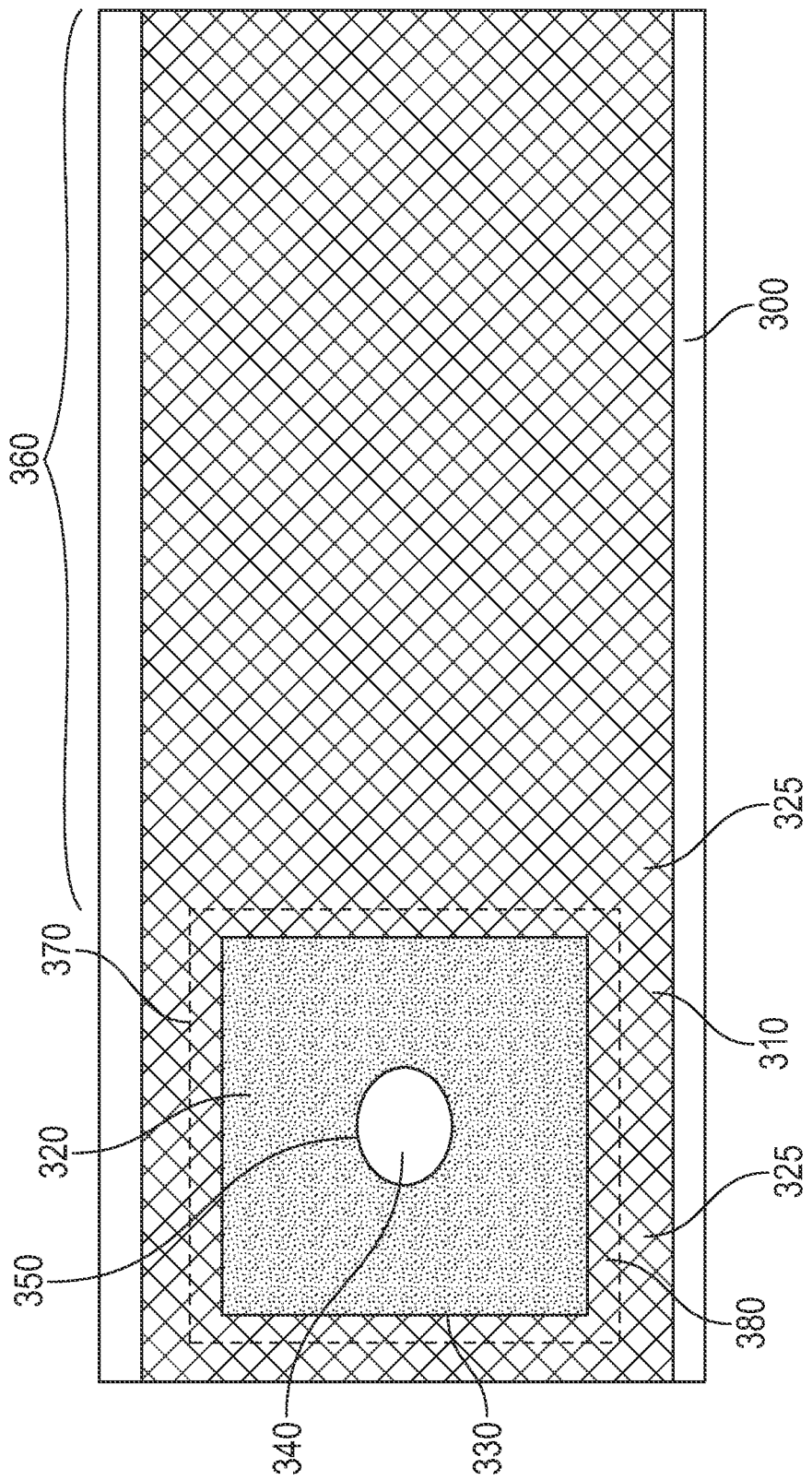
FIG. 3 shows a view of a substrate, in accordance with a further implementation, having patterned and non-patterned powder deposited thereon, subjected to a laser powder removal process and another powder removal technique in accordance with aspects of the present disclosure.

In an implementation of the present disclosure, the time taken to remove powder from a printed layer may be optimized by modifying one or more parameters of the laser based on the area to which the laser is to be applied or by using multiple lasers. These multiple lasers can be substantially identical to one another in terms of their properties and characteristics, or can have different properties and characteristics from one another. FIG. 3 illustrates a substrate 300 on which material, or powder 310 has been applied, extending the length of the substrate 300. This layer of powder 310 has a patterned area 320 in which a binder has been applied to harden the deposited powder, the patterned area 320 having a first boundary 330. The powder layer 310 also includes a feature 340, in this case an aperture, having a second boundary 350. A non-patterned area 325, i.e., the material or powder that has not been exposed to binding material, has not been cured, not been fixed in place, fused or melted includes the non-patterned powder area outside the first boundary 330, including a fill region 360 to the right of the patterned area 320. In an example, the laser 115 (e.g., see FIGS. 1a and 1b) may be operated using a first set of operating parameters, to slowly and accurately remove powder from the first and second boundaries 330, 350, and operated using a second set of operating conditions to more quickly and potentially with less accuracy remove powder within and/or outside these boundaries. In one aspect of the present disclosure, the first set of operating parameters may comprise a more focused, or less divergent beam, and the second set of operating parameters may comprise a less focused, or more diverged beam, one of greater beam diameter as it intersects with the powder on the substrate. In another aspect of the present disclosure, two or more lasers 115 can be utilized rather than modifying the operating parameters of a single laser.

In another implementation, a combination of powder removal techniques, for example using one or more of an air knife, a vibration technique, or another powder removal technique may be combined with a laser removal technique to optimize the time taken to remove the non-patterned or loose powder. The one or more powder removal technique may be selected based on the resolution required at a particular location/region on the substrate, the resolution required for a location/region on the final printed object, the resolution required to enable a subsequent layer to be printed, or a subsequent processing step to be carried out.

In one example, optimization of the time taken to remove all non-patterned powder 325 from an entire layer of the substrate 300 may be accomplished using a combination of powder removal techniques. For example, the fill region 360 to the right-hand side of the patterned area 320, where there is no patterned area, object, or feature with any specific detail that needs to be retained, a region where the resolution is not of particular significance, the non-patterned powder 325 may be removed using an air knife, for example. In the patterned area 320 and the area in which the aperture 340 is located, where there is a need for a higher resolution, a laser removal technique may be more suitable. To minimize the chances that any lower resolution powder removal technique disturbing, breaking or damaging the patterned area 320 or the aperture 340, the lower resolution powder removal technique may be used up to a margin 370, leaving a safe zone 380 of non-patterned powder 325 around the edges of any patterned area 320 or boundary 330. The width of the safe zone 380 may depend upon one or more the powder characteristics (both chemical and physical), binder formulation, curing technique and power removal technique utilized. In an implementation, the width of the safe zone 380 may be selected to accommodate a potential bleed area that results after the patterning process. Bleeding is the result of solidification of areas/portions of material that were not intended to be solidified, due to binder (for example) propagating into surrounding powder. In other implementations, the safe zone 380 may be selected by the user from one or more preset values, for example, 0.2-0.5 mm outside the patterned area 320 or boundary 330. Alternatively, the value of the safe zone 380 may be automatically determined from CAD data, including meta data.

In a further implementation, once the non-patterned powder 325 has been removed from a particular area, for example when the aperture 340 is created, the aperture may be filled with a second material. Utilizing an accurate method to remove the non-patterned powder 325 from the aperture 340, and accurately defining the boundary 350 of the aperture, enabling subsequent processing to occur based on accurate feature definition.

The combination of powder removal techniques used may be dictated by the user, or determined based on information contained in a database or data table provided by the system. Additionally, the order in which the powder removal techniques are applied, the order including the option of performing the operations substantially simultaneously, may similarly be dictated by the user, or based on information contained in a database or data table provided by the system.

In one implementation, a control system for the additive manufacturing system may include a graphical user interface which provides a mechanism by which the user can instruct the system which powder removal technique to utilize in which area of the printed layer, and optionally the order in which to do so. Data may be imported or extracted from a CAD drawing of the printed object, and software provided to enable the user to indicate or outline regions in which a selected powder removal technique should be utilized. Analysis may be performed to extract feature data, identify regions of different resolution, and/or determine margins and safe zone, and associated coordinate data. In another implementation, the software may automatically identify which technique is optimum for which area(s) of the patterned printed layer based on coordinate data, resolution data contained within CAD drawing, or meta data associated therewith. Once determined, this information can be used to instruct operation of the appropriate powder removal technique in each area or region of the patterned printed layer.

In some implementations, the graphical user interface may be utilized to suggest which powder removal techniques may be applied in which areas, and the user be provided with an option to accept or to modify the suggested powder removal techniques, the areas to which they are to be applied, and/or the order in which the techniques are applied. In some implementations, more than one technique may be applied at least partially simultaneously.

Figure 4B:
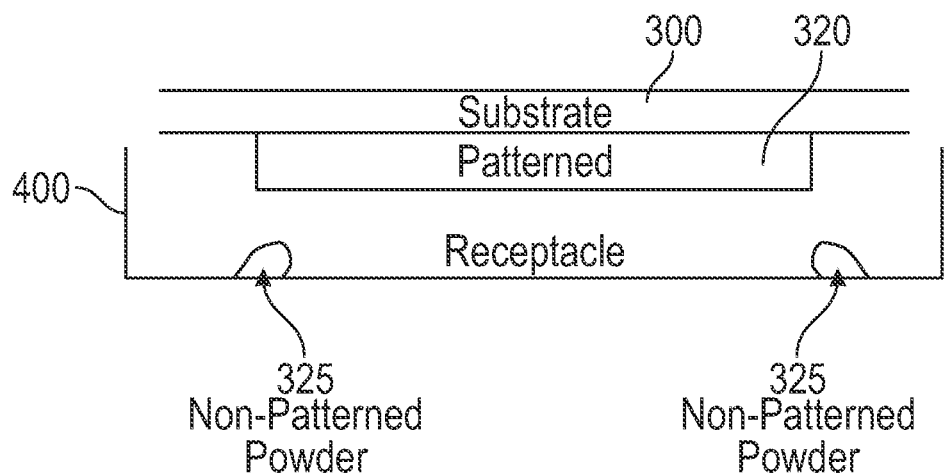
FIG. 4b shows a view of the substrate of FIG. 3a after the laser powder removal processing of FIG. 4a, in accordance with aspects of the present disclosure.

In another implementation, shown in FIGS. 4a and 4b, after patterning a substrate such as the substrate 300 of FIG. 3, and prior the activation of the lasers 415, the substrate 300 is turned 180 degrees along the thickness direction (i.e., inverted or flipped over). The turning of the substrate 300, such that the patterned layer 320 is "hanging" over a powder receptacle 400, allows the non-patterned powder 325 that has been subjected to the laser beam 420 to drop into the powder receptacle 400 below. In this manner, any powder 310 that has not been patterned will drop into the receptacle 400 below and can be recycled for subsequent use. It is noted that mounting the substrate 300 on a carrier plate (see FIG. 6) helps to facilitate turning the substrate 180 degrees. In one implementation, the powder receptacle 400 into which the non-patterned powder drops may depend upon the powder removal technique being utilized. For example, when utilizing an air knife in region 340 (e.g., see FIG. 3), the non-patterned powder 325 may fall into a receptacle 400 for "clean" powder, that is, powder that will not have been exposed to binder. The non-patterned powder 325 that is removed using a laser removal technique, may fall into a receptacle 400 for "contaminated" powder, that is powder 310 that may have been exposed to binder. This is particularly for the non-patterned powder 325 in the region outside the patterned area 320, up to the margin 370, where there is a possibility of bleeding that might occur. In this manner, the "contaminated" and "clean" powders may each undergo the appropriate level of processing to clean them prior to subsequent use.

For implementations in which the substrate 300 is not turned 180 degrees, recycling of the powder(s) 310 may be achieved using other methods such as extracting the non-patterned powder 325 via a vacuum to an appropriate receptacle.

Figure 5:
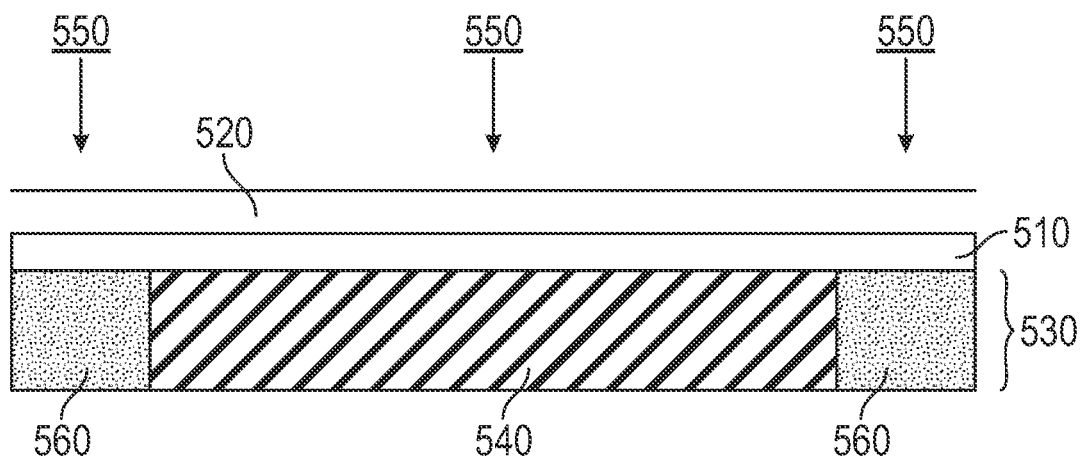
FIG. 5 shows a view of a substrate with a release agent thereon, in accordance with another aspect of the present disclosure.

In a further implementation, such as shown in FIG. 5, a release layer 510 may be provided between the substrate 520 and the powder layer 530. The release layer 510 is configured to improve separation of the patterned layer 540 from the substrate 520 when the laser(s) 550 is applied through the substrate 520. In one aspect of the present disclosure, the release layer 510 may comprise a wetting agent. Absorption of the laser energy by the wetting agent generates pressure within this release layer 510, which in turn causes the patterned powder 540 to detach from the substrate, improving separation of the patterned powder therefrom. In addition, absorption of the laser energy by the non-patterned powder 560 influences the non-patterned powder 560 to be removed from the patterned powder 540. In another aspect of the present disclosure, the release layer 510 may comprise a binder material. Similarly, absorption of the laser energy by the binder elevates the temperature causing the binder to become vapor and/or substantially evaporate, leaving the surface, thereby causing the patterned powder 540 to detach from the substrate 520. In addition, the absorption of the laser energy by the non-patterned powder 560 influences the non-patterned powder 560 to be removed from the patterned powder 540.

Figure 6:
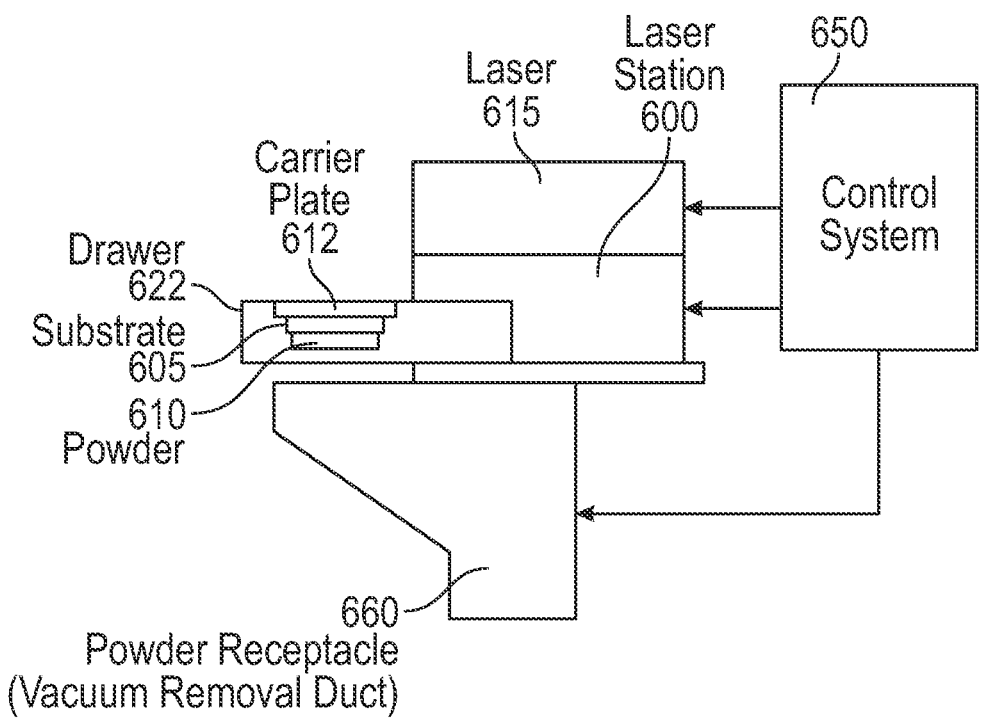
FIG. 6 shows a schematic representation of a laser station for laser powder removal processing of a substrate, having a powder layer deposited thereon and mounted on a carrier plate, in accordance with aspects of the present disclosure.

FIG. 6 shows a schematic representation of a laser station 600 for laser powder removal processing of a substrate 605, as discussed above, having a powder layer 610 deposited thereon and mounted on a carrier plate 612, in accordance with aspects of the present disclosure.

As can be appreciated from FIG. 6, the laser station 600 includes a drawer 622 which is loaded with a carrier plate 612 upon which the substrate 605 and powder 610 have been mounted. In one implementation, loading of the carrier plate 612 may be performed by a robotic arm or similar automated solution. In accordance with one aspect of the present disclosure, the carrier plate 612 with the powder 610 thereon, is inverted before loading into the drawer 622 so that the powder layer 610 is facing downward, as shown, for example, in FIG. 4*a*. The drawer 622 is pushed into the laser station 600, after being loaded with the carrier plate 612, until it contacts a stop mechanism (not shown) inside the laser station 600. Once a sensor (not shown) at the end of a drawer guide track (not shown) inside the laser station 600 determines that the drawer 622 (with the carrier plate 612 inserted therein) has been fully inserted, a laser 615 mounted on top of the laser station 600 is programmed for the laser powder removal operation. This programming can include determining the appropriate laser beam intensity, area, and location, based upon information provided to a control system 650 of the laser station 600 regarding the powder material and the substrate material, to determine the appropriate laser beam parameters for the laser 615 to remove the non-patterned powder of the powder 610 with the laser beam being absorbed by non-patterned powder, without a laser beam generated by the laser 615 being absorbed by either the substrate 605 or the patterned powder that must remain after the laser powder removal processing. These laser beam parameters can be set by the control system 650 to increase the resolution of the patterned area and to remove the bleed area of binder material from the target pattern area. As noted above, the control system 650 can include a camera system for monitoring the amounts of powder in order to determine appropriate levels for the laser beam.

Once the drawer 622 is fully inserted into the laser station 600, the carrier plate 612 loaded into the drawer 622 is then lifted into powder removal range and is sealed inside the laser station 600 below the laser 615. When sealing of the carrier plate 612 is confirmed (by the laser control system 650) the laser 615 turns on and removes powder 610 based on programming of the laser 615. To supplement the laser powder removal operation, an air knife can be located in the laser station, also controlled by the control system 650, which air knife moves back and forth removing powder that has been loosened by the laser beam.

In one implementation, the laser beam from the laser 615 is directed by the control system 650 to a point on the non-patterned powder immediately adjacent to a boundary between the non-patterned powder and the patterned powder. In another implementation, the user or the computing system (e.g., the control system 650 which includes a computer system) can determine an appropriate contour for the laser beam to follow, the contour being, for example, a predetermined distance away (in either direction) from the boundary between the non-patterned powder and the patterned powder.

In another implementation, the laser beam from the laser 615 may be directed by the control system 650) to follow a contour of the boundary between the non-patterned powder and the patterned powder (one or more times, using the same or different laser parameter settings), and then be directed to from a point on the non-patterned powder immediately adjacent the boundary between the non-patterned powder and the patterned powder, outwardly away from the boundary. The outward motion may be linear, or comprise one or more non-linear (for example a curve, spiral, circular or looped) operation(s).

As the non-patterned powder falls from the inverted substrate (e.g., see FIG. 4*a*), it falls into a powder receptacle, specifically, a vacuum removal duct 660 provided below the inverted carrier plate 612, as shown in FIG. 6. Once the powder 610 has been removed, either by the laser 615 or the combination of the laser 615 and an air stream (not shown) applied either while the laser beam is being applied or after the laser beam has been applied and then stopped, the drawer 622 can be pulled out and the carrier plate 612, with the substrate 605 having only the patterned powder remaining thereon, can be removed.

In another implementation, the carrier plate 612 may be transported as part of an automated system, on a conveyor belt or similar feature, with the control system 650 configured to interact with the laser 615 of the laser powder removal system. The interaction comprising, for example, terminating motion of the conveyor belt or similar feature when it is at an appropriate location such that the laser 615, when operated, can perform the laser removal operation, to remove the non-patterned powder. Additionally, a robotic arm, under the control of the control system 650, may be utilized to enable inversion of the carrier plate 612 if required.

FIG. 7 shows an example of integration of the laser powder removal process into an overall system for 3D printing. As shown in FIG. 7, the powder removal step 750 can be integrated after the steps of depositing powder in step 710, applying a conditioning agent (or wetting material) to the deposited powder in step 720, compacting the powder in step 730 and patterning the powder in step 740, resulting in a substrate having sections of patterned powder and non-patterned powder, as shown in FIGS. 1*a*, 2*a* and 4*a*. As also shown in FIG. 7, after the laser powder removal step 750, further processing can include further patterning in step 760, stacking the processed powder layers in step 770 and recycling of powder (step 780) that has been removed and collected during the various processing steps. Further details regarding an overall processing system and operation, and powder regeneration, are disclosed in the above-noted related applications. Integration of the laser powder removal step 750 as part of the non-patterned powder removal system into the overall process shown in FIG. 8 (in which the laser powder removal step 750 can be incorporated into the overall printing operation following compacting of the powder in step 730 and prior to patterning with a binder in step 740) can be achieved such that an overall reduction in manufacturing time can be expected. Alternatively, the powder removal step 750 can be performed both before the patterning step 640 and after the patterning step 640, if desired for more complete powder removal.

More specifically, although a specific order of operations is shown in FIG. 7, the order of the operations could be changed if desired. For example, as shown in FIG. 8, it is possible to use the above-discussed laser powder removal operations 750 on powder deposited on a substrate after compacting 730 and before patterning 740. In this case, the laser powder removal step 750 is used to remove loose powder that exists on the substrate following the application of powder and compacting, but prior to the actual patterning operation. As the unnecessary loose powder is removed, the issue of binder bleeding during binder deposition step can be minimized. In this manner, binder deposition enables patterning to extend all the way to the very edges of the deposited powder, but not bleed out further since there is no powder there to bleed into. This allows further optimization in terms of processing time, as there is no longer a need to remove powder after patterning. Similarly, the compacting step 730 could be performed before applying the binder material, if desired. Also, as discussed in the above-noted related application, powder can be collected and recycled at various points during the process instead of waiting to the end of the process to recycle the powder.

FIG. 9 illustrates a substrate 900 on which material, or powder 910 has been applied, extending the length of the substrate 900. It is desired that this powder layer 910 be processed to define a patterned area 920, with a feature 940, in this case an aperture disposed therein. In one example, optimization of processing may be achieved by performing the laser powder removal step prior to patterning, under the control of a control system such as shown in FIG. 6. An air knife, for example, may be utilized to remove the non-patterned powder in the region 960 to the right-hand side of the desired patterned area 920. In the desired patterned area 920, and the area in which the aperture 940 is to be located, there is a need for a higher resolution, and in these areas, a laser removal technique is more suitable. After powder removal has been performed and the areas defined, the area 920 may be patterned, the patterned layer removed from the substrate, and stacked on another layer or a build platform as part of a multilayer part.

In some implementations of the present disclosure, one or more sensors may provide data which may be used to determine how successful the powder removal operation has been. For example, image acquisition devices may be utilized, providing digital information with respect to the location of any remaining non-patterned powder. Based on this information, including location information, a control system 650 (see FIG. 6) may determine that the laser needs to be operated one or more subsequent times, to complete the powder removal procedure. Alternatively, one or more additional "rows" of laser(s) can be utilized to remove any non-patterned powder that the first laser(s) missed.

Figure 10:
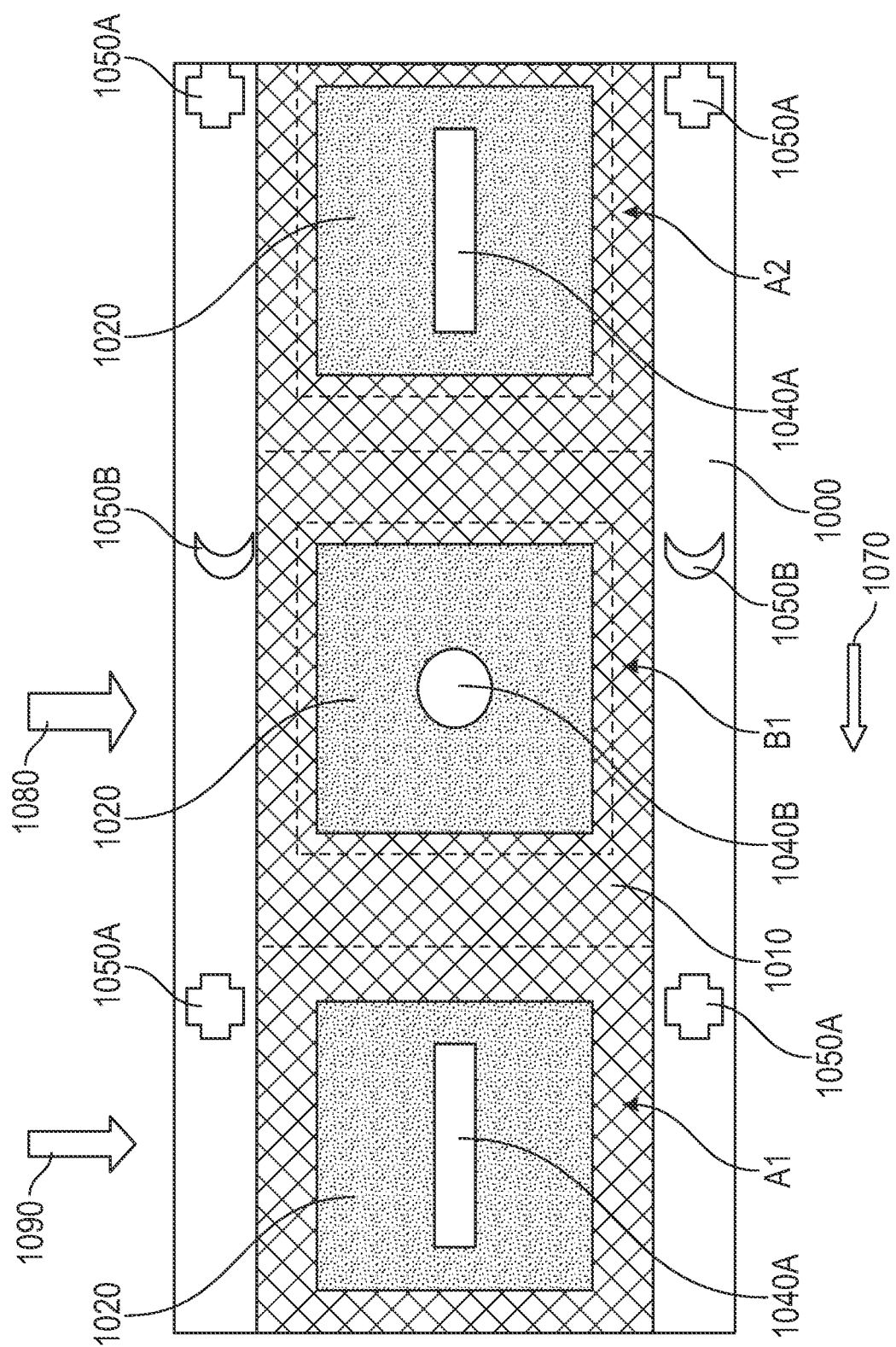
FIG. 10 illustrates a substrate, for example a continuous web or roll of material on which a series of objects have been created.

In order to maximize throughput in terms of the removal of non-patterned powder from multiple objects, or a plurality of areas including both patterned and non-patterned powder, another implementation of the present disclosure enables at least part of the powder removal process to occur for at least two or more object substantially simultaneously. FIG. 10 illustrates a substrate 1000, for example a continuous web or roll of material on which powder 1010 has been deposited, on which a series of objects have been created. The objects may be same as each other, or may differ from each other. In this particular example, objects A1 and A2 are the same, with the feature 1040A taking the form of an elongated slot which partially traverses the object A1, A2; object B1 comprises a feature 1040B which takes the form of an aperture. However, each object A1, A2, B1 comprises an area of patterned powder 1020 and a feature 1040A, 1040B. Reference markings or fiducials on the substrate 1000 correspond to the location of each type of object on the substrate 1000, with the crossed-shaped fiducials 1050A corresponding to the objects A1, A2 with an elongated slot, and the moon-shaped fiducial 1050B corresponding to the object B1 with a circular aperture.

In one specific implementation, the substrate 1000 is conveyed on a conveyorized platform or conveyor belt moving in direction 1070, from right to left. Conveyor belt is stopped from moving when the objects A1 and B1 have been transported to the desired location with respect to the powder removal devices 1080, 1090, to enable operation. An air knife 1080 is operated to remove material or powder that has not been exposed to binding material from the substrate, with care taken to operate the air knife 1080 around object B1, but not within a safe zone or a boundary of the patterned area 1020. The air knife 1080 does not operate in the local areas in which the objects A1 or A2 reside. The moon-shaped fiducial 1050B may be sensed by a sensor associated with a controller of the air knife 1080, to provide operational information for the air knife. Substantially simultaneously, a laser powder removal device 1090 is operated to remove material or powder that has not been exposed to binding material from object A1. The cross-shaped fiducial 1050A may bed sensed by a sensor associated with a controller of the laser powder removal device 1090, to provide operational information for the laser powder removal device. In one example, the laser powder removal device 1090 may be controlled to first to remove powder from the boundary of the patterned area 1020, and then to remove powder from the entire layer of powder within a local area in which object A1 resides. The laser powder removal device 1090 does not operate within the local areas in which objects B1 and A2 reside. In this manner two powder removal techniques may be applied substantially simultaneously in different areas of the substrate. In one configuration, the conveyor belt is stationary as the powder removal devices 1080, 1090 operate in their respective operational areas. Once powder has been removed from those respective areas within which objects A1 and B1 reside, the conveyor belt operates to move the objects in direction 1070, such that powder can be removed from object B1 by operation of the laser powder removal device 1090, and powder can be removed from object A2 by operation of the air knife 1080. In another configuration, the conveyor belt may substantially continuously move. All of the above-described operations shown in FIG. 10 can be performed using a control system 650 such as shown in FIG. 6.

In an alternative implementation, a series of air knifes 1080 and laser powder removal devices 1090 may be provided, enabling higher throughput to be realized. In this manner a technical solution is provided for speeding up the powder removal process by configuring and operating the powder removal techniques to be synchronized. Synchronization may be between the powder removal techniques and/or location of objects on the substrate. In some implementations, the synchronization may also be based on a duration of operation of a powder removal device, and/or a speed of movement of the substrate motion, to enable coordination of their respective operations and/or location of operations.

It is noted that although the above description has primarily been presented in terms of removing powder from a substrate with a deposited layer in the environment of additive manufacturing, such as 3D printing, the apparatus and method of this disclosure is not limited to only such structure, and they could be used in any situation where it is desired to remove powder in conjunction with processing of the powder in a plurality of different stations.

In the following, further features, characteristics and advantages of the instant application will be described by means of items:

Item 1: A method for removing non-patterned powder from a substrate having a patterned powder portion, and a non-patterned powder, deposited thereon, including applying at least one laser having beam parameters to the non-patterned powder for a period of time sufficient to remove the non-patterned powder from the substrate so that an upper surface of the substrate where the non-patterned powder had been located is free of the non-patterned powder, while leaving the patterned powder portion on the substrate.

Item 2: The method of item 1, wherein beam parameters of the at least one laser and the materials of the powder and the substrate are preset so that power from the laser is absorbed by the non-patterned powder, but not by the substrate.

Item 3: The method of item 1 or 2, wherein the beam parameters of the at least one laser includes a profile of the laser, wavelength of the laser, power of the laser, operational time of application of the laser to the non-patterned powder, area of application of the laser, and depth of absorption of the laser in the non-patterned powder.

Item 4: The method of any one of items 1-3, wherein the at least one laser is applied to the non-patterned powder to increase a temperature of the non-patterned powder for a period of time sufficient for the specified amount of the non-patterned powder to reach a required temperature to separate the non-patterned powder from the patterned powder.

Item 5: The method of any one of items 1-4, wherein the at least one laser is applied to a point on the non-patterned powder immediately adjacent to a boundary between the non-patterned powder and the patterned powder.

Item 6: The method of any one of items 1-5, wherein the at least one laser is moved from the point on the non-patterned powder immediately adjacent to a boundary between the non-patterned powder and the patterned powder, where it is initially applied, outwardly away from the boundary.

Item 7: The method of any one of items 1-6, further comprising monitoring volume of the non-patterned powder while the at least one laser is being applied thereto to control operation and movement of the laser.

Item 8: The method of any one of items 1-7, wherein the laser is applied from above the substrate and the non-patterned powder.

Item 9: The method of any one of items 1-8, wherein the laser is applied from below the substrate and the non-patterned powder so that the substrate is located between a source of the laser and the non-patterned powder.

Item 10: The method of any one of items 1-9, wherein the substrate is inverted so that the non-patterned powder is suspended over a powder receptacle, and the laser is applied from above the substrate and the non-patterned powder so that the substrate is located between a source of the laser and the non-patterned powder, and the powder receptacle is located below the substrate and the non-patterned powder to collect non-patterned powder that falls from the substrate during application of the laser.

Item 11: The method of any one of items 1-10, wherein the substrate and the powder are mounted on a carrier plate inserted into a laser station including a laser source, located above the carrier plate, and the powder receptacle, located below the carrier plate.

Item 12: The method of any one of items 1-11, further comprising recycling the non-patterned powder after removal from the substrate.

Item 13: The method of any one of items 1-12, further comprising applying an air stream to the non-patterned powder while the at least one laser is being applied to the non-patterned powder.

Item 14: The method of any one of items 1-13, further comprising applying an air stream to the non-patterned powder after the at least one laser has been applied to the non-patterned powder.

Item 15: The method of any one of items 1-14, wherein the beam parameters are set to increase resolution of the patterned area and to remove a bleed area of binder material from a target pattern area which the at least one laser is directed toward.

Item 16: The method of any one of items 1-15, wherein the beam parameters are configured to allow a user to determine a contour for the laser beam to follow, and where to point the laser beam.

Item 17: The method of any one of items 1-16, wherein the contour can be a line or a spiral.

Item 18: The method of any one of items 1-17, wherein the beam parameters are configured to allow for multiple contours of the laser beam with multiple laser parameter sets.

Item 19: The method of any one of items 1-18, further comprising applying a plurality of lasers to generate a plurality of laser beams and one or more additional powder removal techniques to remove the non-patterned powder from the substrate.

Item 20: The method of any one of items 1-19, wherein the powder is removed from an entire layer on the substrate.

Item 21: The method of any one of items 1-20, wherein the plurality of lasers and the one or more additional powder removal techniques are applied to remove the non-patterned powder in multiple locations from the substrate substantially simultaneously.

Item 22: The method of any one of items 1-21, wherein the one or more additional powder removal techniques includes at least one of an air knife or an vibration technique.

Item 23: The method of any one of items 1-22, further comprising transferring the patterned layer to a build plate following removal of the non-patterned powder from the substrate.

Item 24: The method of any one of items 1-23, further comprising a release layer located between the substrate and both the patterned powder portion and the non-patterned portion of the powder.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The invention claimed is:

1. A method for removing non-patterned powder from a substrate having a patterned powder portion and a non-patterned powder deposited thereon, comprising:
   applying at least one laser having beam parameters to the non-patterned powder for a period of time sufficient to cause the non-patterned powder to become dislodged and removed from the substrate while leaving the patterned powder portion on the substrate;
   configuring the beam parameters of the at least one laser so that power from the at least one laser is absorbed by materials of the non-patterned powder thereby dislodging and removing the non-patterned powder from an upper surface of the substrate without damaging the substrate, the dislodged and removed non-patterned powder being reusable; and
   causing remaining non-patterned powder that has been dislodged from the substrate to be removed from the upper surface of the substrate.

2. The method of claim 1, wherein the beam parameters of the at least one laser includes at least one of a profile of the laser, wavelength of the laser, power of the laser, operational time of application of the laser to the non-patterned powder, area of application of the laser, and depth of absorption of the laser in the non-patterned powder.

3. The method of claim 1, further comprising applying the at least one laser to the non-patterned powder to increase a temperature of the non-patterned powder for a period of time sufficient for the non-patterned powder to reach a required temperature to dislodge and remove the non-patterned powder from the patterned powder portion.

4. The method of claim 3, further comprising applying the at least one laser to a point on the non-patterned powder immediately adjacent to a boundary between the non-patterned powder and the patterned powder portion.

5. The method of claim 4, further comprising moving the at least one laser away from the point on the non-patterned powder immediately adjacent to the boundary between the non-patterned powder and the patterned powder portion.

6. The method of claim 1, further comprising monitoring a volume of the non-patterned powder while the at least one laser is being applied thereto to control operation and movement of the at least one laser.

7. The method of claim 1, further comprising applying the at least one laser from above the substrate and the non-patterned powder.

8. The method of claim 1, further comprising applying the laser to the non-patterned powder through and from below the substrate and the non-patterned powder so that the substrate is located between a source of the at least one laser and the non-patterned powder.

9. The method of claim 1, wherein causing the remaining non-patterned powder that has been dislodged from the substrate to be removed from the upper surface of the substrate comprises:
   inverting the substrate so that the non-patterned powder is suspended over a powder receptacle,
   applying the at least one laser to the non-patterned powder through the substrate from above so that the substrate is located between a source of the at least one laser and the non-patterned powder, and the powder receptacle is located below the substrate and the non-patterned powder to collect the non-patterned powder that falls from the substrate during application of the at least one laser.

10. The method of claim 9, further comprising mounting the substrate on a carrier plate inserted into a laser station, the laser station comprising the source of the at least one laser, the source of the at least one laser being located above the carrier plate and the powder receptacle being located below the carrier plate.

11. The method of claim 1, further comprising recycling the non-patterned powder after removal from the substrate.

12. The method of claim 1, wherein causing the remaining non-patterned powder that has been dislodged from the substrate to be removed from the upper surface of the substrate comprises:
   applying an air stream to the non-patterned powder while applying the at least one laser to the non-patterned powder.

13. The method of claim 1, wherein causing the remaining non-patterned powder that has been dislodged from the substrate to be removed from the upper surface of the substrate comprises:
   applying an air stream to the non-patterned powder after applying the at least one laser to the non-patterned powder.

14. The method of claim 1, further comprising configuring the beam parameters to increase a resolution of a patterned area and to remove a bleed area of binder material from a target pattern area which the at least one laser is directed towards.

15. The method of claim 1, further comprising configuring the beam parameters to allow a user to determine a contour for the at least one laser to follow and a location to point the at least one laser.

16. The method of claim 15, wherein the contour is at least one of a line and a spiral.

17. The method of claim 1, further comprising applying one or more additional powder removal techniques to remove the non-patterned powder from the substrate.

18. The method of claim 17, wherein the non-patterned powder is removed from an entire layer on the substrate.

19. The method of claim 17, wherein the one or more additional powder removal techniques includes at least one of an air knife and a vibration technique.

20. The method of claim 1, further comprising transferring the patterned powder portion to a build plate following removal of the non-patterned powder from the substrate.

21. The method of claim 1, further comprising a release layer located between the substrate and both the patterned powder portion and the non-patterned portion.

22. The method of claim 15, further comprising configuring the beam parameters for the at least one laser based on each contour or each area to which the at least one laser is to be applied.

23. The method of claim 17, further comprising applying the at least one laser and the one or more additional powder removal techniques to remove the non-patterned powder in multiple locations from the substrate.

* * * * *